United States Patent
Kang et al.

(10) Patent No.: US 8,659,576 B2
(45) Date of Patent: Feb. 25, 2014

(54) LIQUID CRYSTAL DISPLAY WITH TOUCH SCREEN FUNCTION AND METHOD FOR DETECTING EXTERNAL ILLUMINANCE USING THE SAME

(75) Inventors: Chang Heon Kang, Icheon-Si (KR); Seong Jun An, Icheon-Si (KR); Se Jong Yoo, Icheon-Si (KR); Hyun Chul Nam, Icheon-Si (KR); Se Hwan Na, Icheon-Si (KR)

(73) Assignee: Hydis Technologies Co., Ltd., Icheon-Si (KR)

( * ) Notice: Subject to any disclaimer, the term of this patent is extended or adjusted under 35 U.S.C. 154(b) by 1177 days.

(21) Appl. No.: 12/574,431

(22) Filed: Oct. 6, 2009

(65) Prior Publication Data

US 2010/0103130 A1    Apr. 29, 2010

(30) Foreign Application Priority Data

Oct. 27, 2008   (KR) .................. 10-2008-0105116

(51) Int. Cl.
   *G06F 3/042*        (2006.01)
(52) U.S. Cl.
   USPC ..................... 345/175; 345/87; 178/18.09
(58) Field of Classification Search
   USPC ..................................................... 345/173
   See application file for complete search history.

(56) References Cited

U.S. PATENT DOCUMENTS

| | | | | |
|---|---|---|---|---|
| 4,345,248 A | | 8/1982 | Togashi et al. | |
| 5,204,661 A | * | 4/1993 | Hack et al. | 345/88 |
| 5,386,543 A | * | 1/1995 | Bird | 358/1.1 |
| 5,485,177 A | * | 1/1996 | Shannon et al. | 345/182 |
| 5,550,659 A | * | 8/1996 | Fujieda et al. | 349/12 |
| 5,691,783 A | * | 11/1997 | Numao et al. | 349/48 |
| 5,838,308 A | * | 11/1998 | Knapp et al. | 345/173 |
| 6,995,743 B2 | | 2/2006 | Boer et al. | |
| 7,742,041 B2 | * | 6/2010 | Lee et al. | 345/173 |
| 2005/0093851 A1 | * | 5/2005 | Nakamura et al. | 345/204 |
| 2005/0117079 A1 | * | 6/2005 | Pak et al. | 349/43 |
| 2007/0109239 A1 | | 5/2007 | den Boer et al. | |
| 2007/0290971 A1 | * | 12/2007 | Shih et al. | 345/90 |

FOREIGN PATENT DOCUMENTS

KR   1020070082643 A   8/2007
KR   1020070103143 A   10/2007

* cited by examiner

*Primary Examiner* — Dorothy Harris (74) *Attorney, Agent, or Firm* — The Webb Law Firm (57) ABSTRACT

An Liquid Crystal Display (LCD) with a touch screen function includes an array substrate having a display region and a photosensitive region divided by data lines, scan lines, and common lines, wherein the photosensitive region includes a switching element having a first terminal connected to an $(n-1)^{th}$ scan line to receive a select signal and a second terminal connected to a readout system, a charge storage element having a first terminal connected to a third terminal of the switching element and a second terminal connected to the common lines, and a photosensitive element having a first terminal connected to an $n^{th}$ scan line and a second terminal connected to the first terminal of the charge storage element, wherein when the photosensitive element is turned on according to external illuminance, the charge storage element is discharged and the readout system detects a difference of external illuminance.

15 Claims, 5 Drawing Sheets

FIG. 1

PRIOR ART

FIG. 2

PRIOR ART

FIG. 3

PRIOR ART

LIQUID CRYSTAL DISPLAY WITH TOUCH SCREEN FUNCTION AND METHOD FOR DETECTING EXTERNAL ILLUMINANCE USING THE SAME

BACKGROUND

1. Field of the Invention

The present invention relates to a Liquid Crystal Display (LCD) with a touch screen function, and more particularly, to technology for embedding a touch screen into an LCD without a separate touch screen device.

2. Discussion of Related Art

An LCD with a touch screen function receives inputs by finger or stylus on its surface without a separate input unit like a keypad. The LCD with a touch screen is divided into a resistive type, a capacitive type, a Surface Acoustic Wave (SAW) type, and an infrared type according to a data detection method. However, since a touch screen panel is attached to the LCD in each of these types, thickness of a product increases, cost increases, yield decreases, and viewing angle decreases.

To address these problems, technologies for forming a touch screen panel inside an LCD in an in-cell type have been developed, as disclosed in Korean Patent Application Nos. 2006-34878, 2006-15480, etc. In U.S. Pat. Nos. 4,345,248, 5,485,177, 6,995,743, etc., which relate to a method of using leakage current of a phototransistor, technologies for forming both a display region and a photosensitive region on an array substrate are disclosed.

Figure 1:
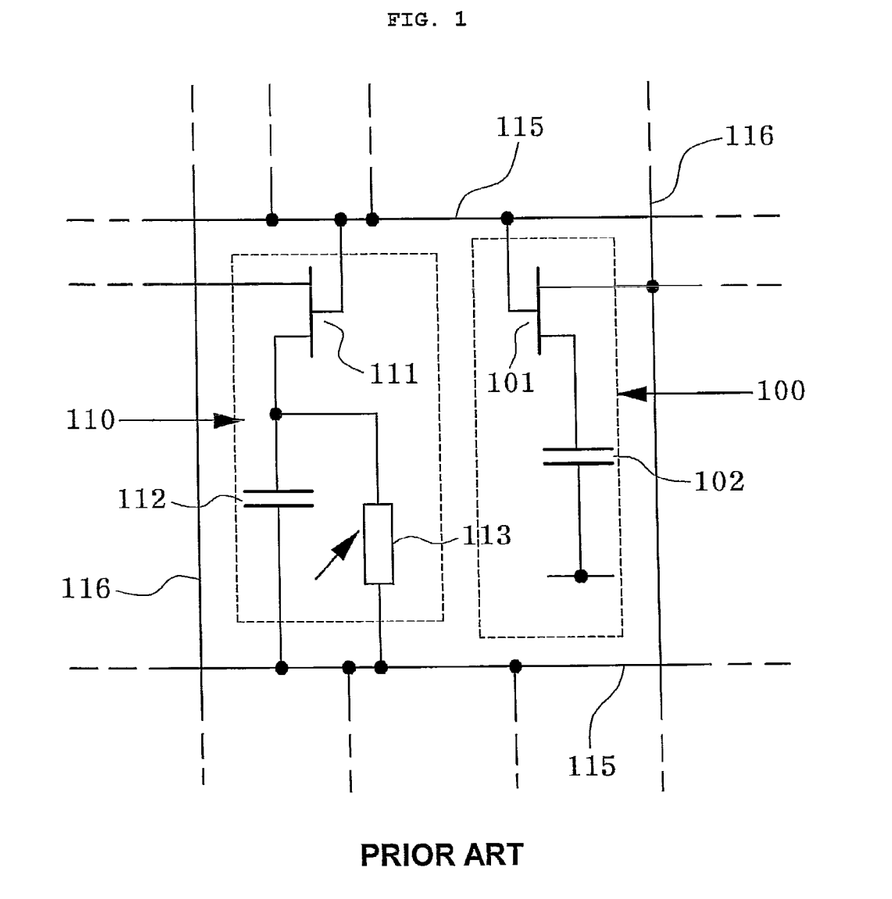
FIG. 1 is a circuit diagram illustrating an example in which an array substrate includes a display region and a photosensitive region in a conventional LCD with a touch screen function.

For example, in U.S. Pat. No. 5,485,177, an array substrate includes a display region 100 and a photosensitive region 110 as shown in FIG. 1. Referring to FIG. 1, a photosensitive element 113, a switching element 111, and a charge storage element 112 are formed in the photosensitive region 110. One end of the photosensitive element 113 is connected to the charge storage element 112 and the other end is connected to a scan line 115. When a voltage is applied to the scan line 115 connected to the switching element 111, the charge storage element 112 is charged to a voltage applied from a column line 116 of the switching element 111. Each photosensitive element 113 operates to discharge electric charge stored in the charge storage element 112 depending on illuminance.

However, this operation method has a disadvantage in that the load of the scan lines is heavy since the charge storage element 112 is connected to each scan line 115. When the resolution of the LCD increases, a photosensitive region is not needed for each pixel. In this case, a load difference occurs between scan lines of a pixel with the photosensitive region and a pixel without the photosensitive region, degrading pixel quality of the LCD.

Figure 2:
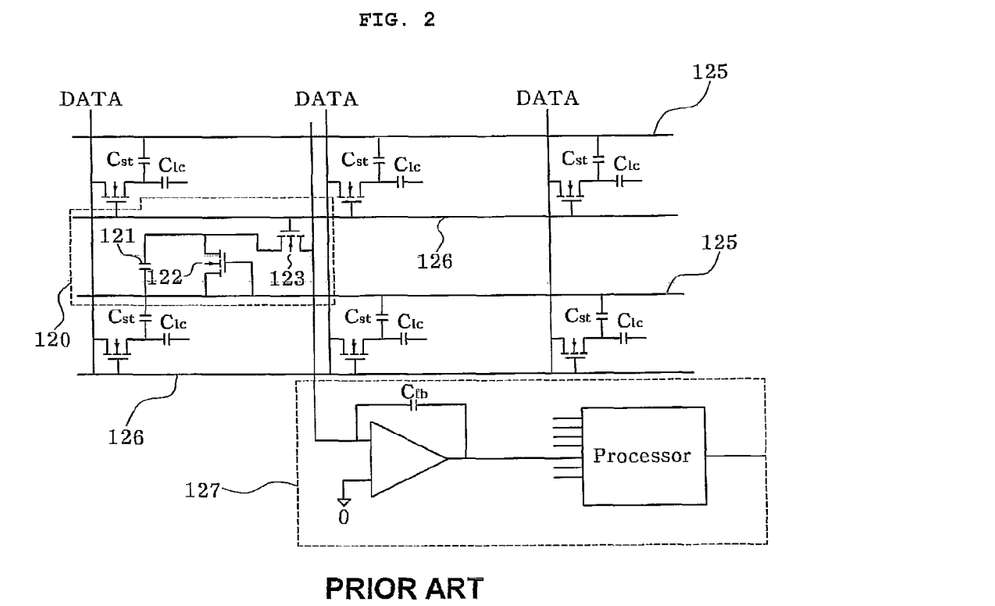
FIG. 2 is a circuit diagram of a conventional LCD with a touch screen function.
Figure 3:
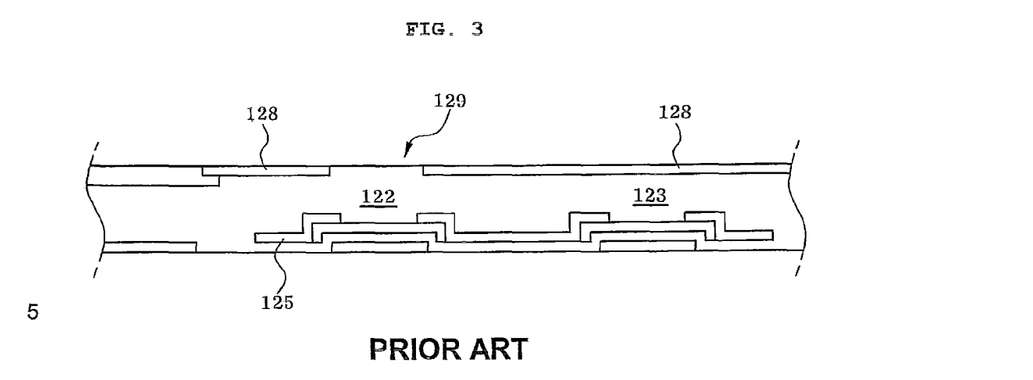
FIG. 3 is a cross-sectional view of the conventional LCD with a touch screen function.

In another example, U.S. Pat. No. 6,995,743 relates to an LCD in which an array substrate includes a display region and a photosensitive region. FIG. 2 is a circuit diagram of a conventional LCD with a touch screen function, and FIG. 3 is a cross-sectional view of the LCD.

Referring to FIG. 2, a photosensitive region 120 of the array substrate includes a photosensitive element 122, a switching element 123, and a charge storage element 121. In general, a phototransistor is used as the photosensitive element 122. Gate and source terminals of the phototransistor are connected to a common line 125. A drain terminal of the phototransistor is connected to the switching element 123 and one end of the charge storage element 121. The other end of the charge storage element 121 is connected to the common line 125. Consequently, the gate and source terminals of the phototransistor 122 are connected electrically. A gate terminal of the switching element 123 is connected to a scan line 126. The other terminals of the switching element 123 are connected to a readout system 127. Referring to FIG. 3, an upper portion of the switching element 123 is covered with a black matrix 128 to block external light, but an upper portion of the phototransistor 122 is open and exposed to external light as indicated by reference numeral 129.

When light is incident on the photosensitive element 120, a current flows through the phototransistor 122 and an output based on a difference of illuminance incident on the phototransistor 122 is read out through the switching element 123.

Here, a maximum readout voltage is proportional to a difference between a gate-source voltage of the phototransistor 122 and a voltage stored in the charge storage element 121 through the switching element 123. The voltage stored in the charge storage element 121 through the switching element 123 is set by the readout system 127 and the gate-source voltage of the phototransistor 122 is a common voltage supplied to the common line 125 of the LCD. The common voltage is a different value according to an LCD operation scheme. For example, in a dot inversion scheme, the common voltage has a value computed by subtracting an offset voltage from a middle data voltage value when an LCD data voltage range is 0~10 V. When the LCD data voltage range is −5~5 V, the common voltage has a value computed by subtracting the offset voltage from 0 V corresponding to the middle value. In a line inversion scheme, the common voltage has a value computed by subtracting the offset voltage from 0~5 V whose polarity has changed when the LCD data voltage range is 0~5 V.

Consequently, in the conventional LCD with a touch screen function, a difference between voltages applied to both ends of the charge storage element becomes a difference between a common voltage and a voltage applied by the readout system. Therefore, there is a problem in that a maximum readout voltage decreases when the difference between the voltages applied to both the ends of the charge storage element is small.

SUMMARY OF THE INVENTION

The present invention is directed to an LCD with a touch screen function and a method for detecting external illuminance using the same that can reduce the load of scan lines by connecting a charge storage element to a common line for a display operation in a photosensitive region of an array substrate, and that can increase a maximum readout voltage by increasing voltages applied to both terminals of the charge storage element.

According to an aspect of the present invention, there is provided an LCD with a touch screen function, including: an array substrate having a display region and a photosensitive region divided by data lines, scan lines, and common lines, wherein the photosensitive region includes: a switching element having a first terminal connected to an $(n-1)^{th}$ scan line to receive a select signal and a second terminal connected to a readout system; a charge storage element having a first terminal connected to a third terminal of the switching element and a second terminal connected to the common lines; and a photosensitive element having a first terminal connected to an $n^{th}$ scan line and a second terminal connected to the first terminal of the charge storage element, wherein when the photosensitive element is turned on according to external illuminance, the charge storage element is discharged and the readout system detects a difference of external illuminance.

The switching element may be turned on and the charge storage element may be charged to a reference voltage of the readout system when the $(n-1)^{th}$ scan line is selected, the photosensitive element may be turned on and the charge storage element may be charged to a select voltage of the $n^{th}$ scan line when the $n^{th}$ scan line is selected, and the readout system may detect the difference of external illuminance by measuring a charge amount of the charge storage element when the $(n-1)^{th}$ scan line is re-selected.

The switching element may be turned on and the charge storage element may be charged to a reference voltage of the readout system when the $(n-1)^{th}$ scan line is selected, the photosensitive element may be turned on and the charge storage element may be charged to a select voltage of the $n^{th}$ scan line when the $n^{th}$ scan line is selected, and the readout system may detect the difference of external illuminance by measuring a discharge amount of the charge storage element when the $(n-1)^{th}$ scan line is re-selected.

The switching element may be turned on and the charge storage element may be charged to a reference voltage of the readout system when the $(n-1)^{th}$ scan line is selected, and the photosensitive element may be turned on and the charge storage element may be charged to a select voltage of the $n^{th}$ scan line when the $n^{th}$ scan line is selected. When the $(n-1)^{th}$ scan line is re-selected, the readout system may detect the difference of external illuminance by measuring a charge amount from the readout system to the charge storage element if a voltage stored in the charge storage element is lower than the reference voltage of the readout system and measuring a discharge amount from the charge storage element to the readout system if a voltage stored in the charge storage element is higher than the reference voltage of the readout system.

The select voltage of the scan line may be higher than the reference voltage of the readout system.

The switching element may be a transistor in which the first terminal is a gate, the second terminal is a source, and the third terminal is a drain.

The photosensitive element may be a photodiode in which the first terminal is an anode and the second terminal is a cathode. The photosensitive element may further include a third terminal connected to a scan line and may be a phototransistor in which the first terminal is a source, the second terminal is a drain, and the third terminal is a gate.

According to another aspect of the present invention, there is provided a method for detecting a difference of external illuminance in a readout system when a photosensitive element is turned on according to the external illuminance and a charge storage element is discharged in an LCD with a touch screen function in which a photosensitive region includes a switching element, the charge storage element, and the photosensitive element, the method including: turning on the switching element and charging the charge storage element to a reference voltage of the readout system when an $(n-1)^{th}$ scan line is selected; turning on the photosensitive element and charging the charge storage element to a select voltage of an $n^{th}$ scan line when the $n^{th}$ scan line is selected; and detecting, when the $(n-1)^{th}$ scan line is re-selected in a next frame and the switching element is turned on, the difference of external illuminance by measuring a discharge amount from the charge storage element to the readout system if a voltage stored in the charge storage element is higher than the reference voltage of the readout system and measuring a charge amount from the readout system to the charge storage element if a voltage stored in the charge storage element is lower than the reference voltage of the readout system.

The select voltage of the scan line may be higher than the reference voltage of the readout system.

The switching element of the photosensitive region may include a first terminal connected to a scan line and a second terminal connected to the readout system, the charge storage element may include a first terminal connected to a third terminal of the switching element and a second terminal connected to a common line, and the photosensitive element may include a first terminal connected to a scan line and a second terminal connected to the first terminal of the charge storage element.

The switching element may be a transistor in which the first terminal is a gate, the second terminal is a source, and the third terminal is a drain.

The photosensitive element may be a photodiode in which the first terminal is an anode and the second terminal is a cathode. The photosensitive element may further include a third terminal connected to a scan line and may be a phototransistor in which the first terminal is a source, the second terminal is a drain, and the third terminal is a gate.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 4:
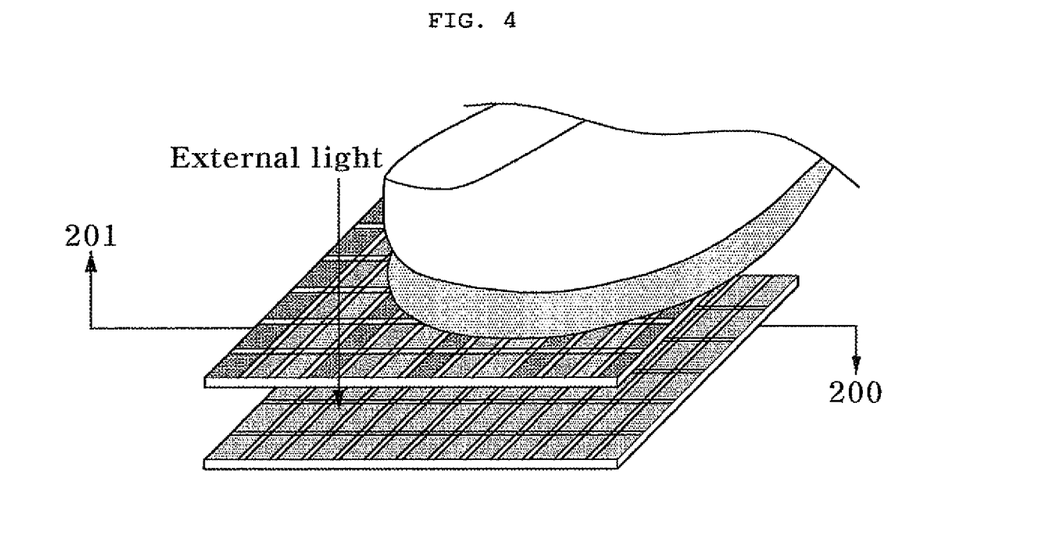
FIG. 4 is a conceptual diagram of an in-cell type LCD with a touch screen function.
Figure 5:
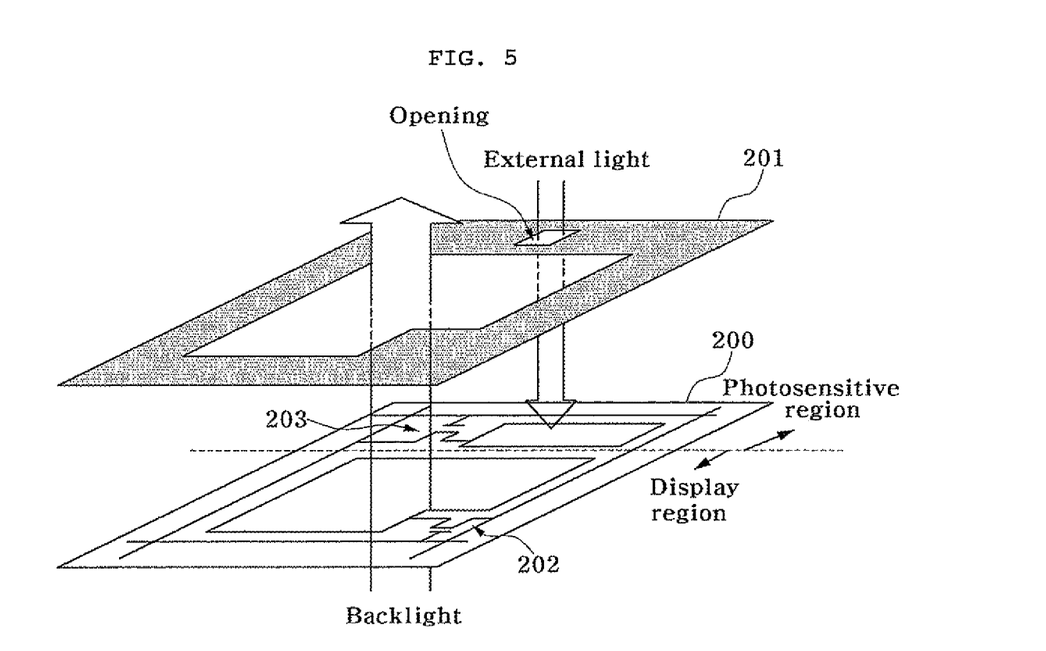
FIG. 5 illustrates details of operation principles of first and second substrates of FIG. 4.

FIG. 4 is a conceptual diagram of an LCD with a touch screen function and FIG. 5 illustrates details of operation principles of first and second substrates of FIG. 4.

The present invention relates to technology for forming a touch screen panel inside the LCD in an in-cell type. In the LCD, an array substrate includes both a display region for a display operation and a photosensitive region configured with a photosensitive element, a charge storage element, and a switching element.

Referring to FIGS. 4 and 5, the LCD includes a first substrate 200 and a second substrate 201. The second substrate 201 is formed to face the first substrate 200 in parallel. The second substrate 201 includes a black matrix layer for covering a region where a pixel electrode is not formed and a color filter layer for implementing image colors. In the second substrate 201, a point spacer is selectively formed to maintain a predetermined distance from the first substrate 200.

The first substrate 200 includes a plurality of horizontal scan lines formed to drive liquid crystal, a plurality of data lines formed to intersect with the scan lines, a switching element 202 formed for data input at an intersection point between scan and data lines, and a pixel electrode and a common electrode connected to the switching element and formed to apply a voltage to the liquid crystal.

FIG. 5 shows an example in which both a display region and a photosensitive region whose characteristics varies with external illuminance are formed on the first substrate 200 in an LCD with a touch screen function. The photosensitive region and the display region include switching elements 203 and 202, respectively. In the second substrate 201, it can be seen that a portion corresponding to the display region and a portion where a photosensitive element is placed in the photosensitive region are not covered with a black matrix.

As shown in FIGS. 4 and 5, external light reaches the photosensitive region through an opening of the second substrate 201. When a human finger covers the opening of a particular photosensitive region, the external light does not pass through a covered portion and therefore a photosensitive element of the photosensitive region does not operate.

Figure 6A:
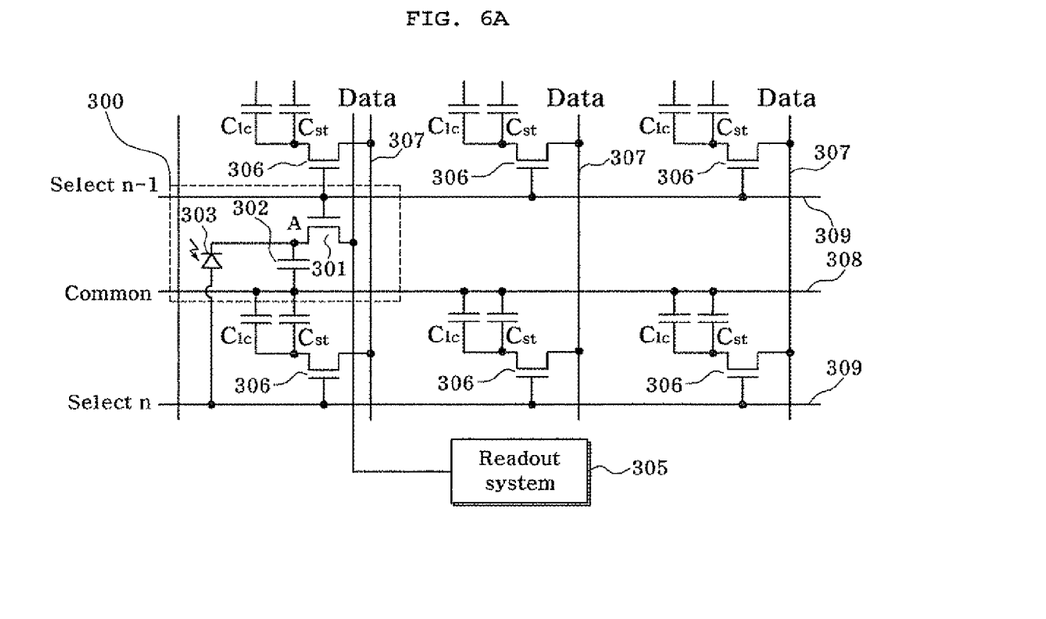
FIGS. 6A and 6B are circuit diagrams of an in-cell type LCD with a touch screen function according to an exemplary embodiment of the present invention.
Figure 6B:
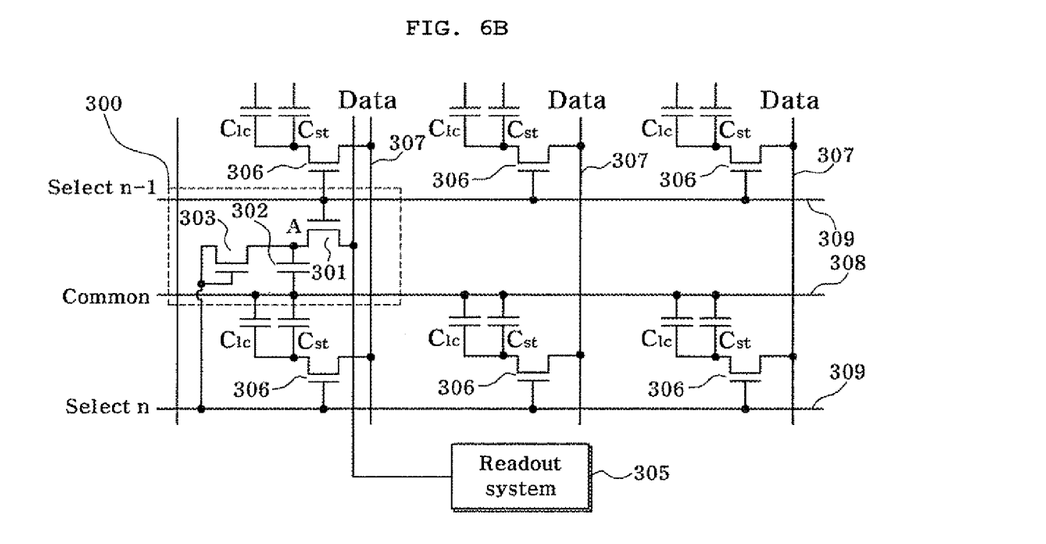

FIGS. 6A and 6B are circuit diagrams of an LCD with a touch screen function according to an exemplary embodiment of the present invention.

Referring to FIGS. 6A and 6B, the LCD with the touch screen function has data lines 307, scan lines 309, and a common line 308 by which a display region and a photosensitive region are divided on an array substrate. Here, a photosensitive region 300 includes a switching element 301, a charge storage element 302, and a photosensitive element 303.

The switching element 301 has a gate terminal connected to a scan line 309, a source terminal connected to a readout system 305, and a drain terminal connected to the charge storage element 302. The switching element 301 transfers a reference voltage supplied from the readout system 305 to the charge storage element 302. The switching element 301 is controlled by a select signal of the scan line 309. The switching element 301 is configured with a Thin Film Transistor (TFT) and a semiconductor layer of the transistor is made of amorphous silicon (a-Si).

The charge storage element 302 has a first terminal connected to the drain terminal of the switching element 301 and a second terminal connected to the common line 308. The charge storage element 302 receives and stores a reference voltage transferred from the switching element 301 and a select voltage of the scan line 309 transferred from the photosensitive element 303. A capacitor can be used as the charge storage element 302.

The photosensitive element 303 is a device through which a current flows when external light is applied. A photodiode or phototransistor can be used as the photosensitive element 303. FIG. 6A shows an example in which the photodiode is used as the photosensitive element 303 and FIG. 6B shows an example in which the phototransistor is used as the photosensitive element 303.

Referring to FIG. 6A, when the photosensitive element 303 is the photodiode, an anode terminal is connected to the scan line 309 and a cathode terminal is connected to the first terminal of the charge storage element 302. However, the anode terminal of the photosensitive element is connected to the next $n^{th}$ scan line, not an $(n-1)^{th}$ scan line connected to the gate terminal of the switching element 301, in the same photosensitive region.

Referring to FIG. 6B, when the photosensitive element 303 is the phototransistor, its gate and source terminals connected to each other are connected to the scan line 309, particularly, the next $n^{th}$ scan line, not the $(n-1)^{th}$ scan line connected to the gate terminal of the switching element 301, in the same photosensitive region. A drain terminal of the photosensitive element 303 is connected to the first terminal of the charge storage terminal 302 and a select voltage of the scan line 309 is supplied to the charge storage element 302.

Figure 7:
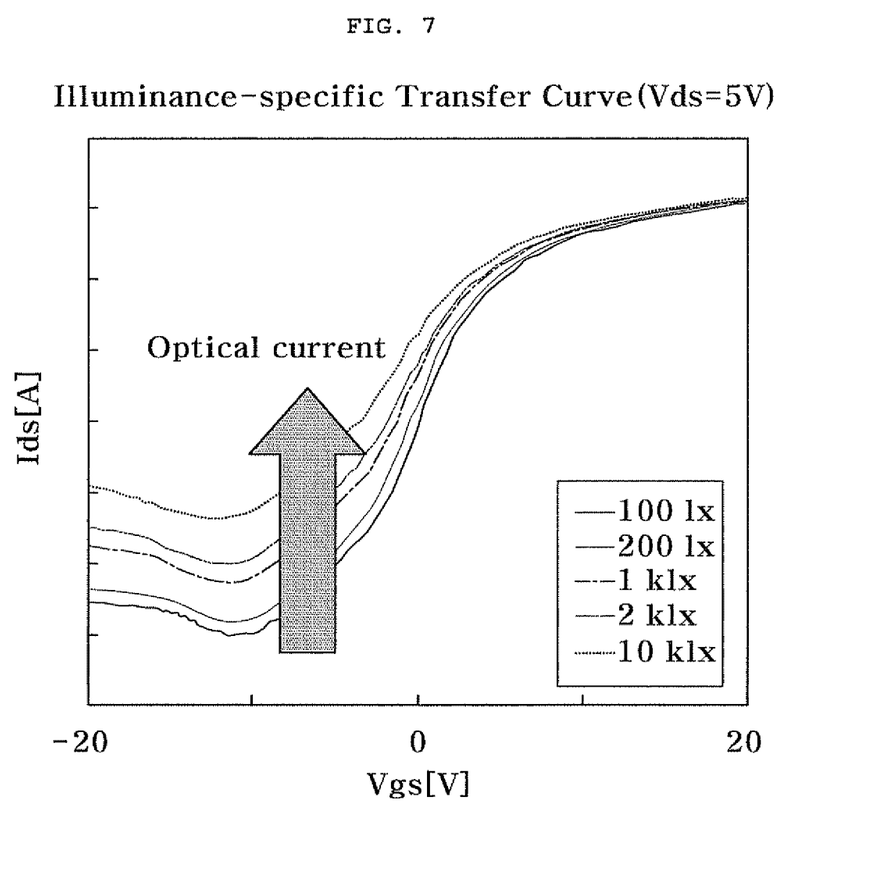
FIG. 7 is a graph illustrating an optical current varying with external light in a photosensitive element shown in FIGS. 6A and 6B.

FIG. 7 is a graph illustrating an optical current varying with external light in the photosensitive element. As illuminance of the external light increases, optical current passing through the photosensitive element increases as shown in FIG. 7.

Figure 8:
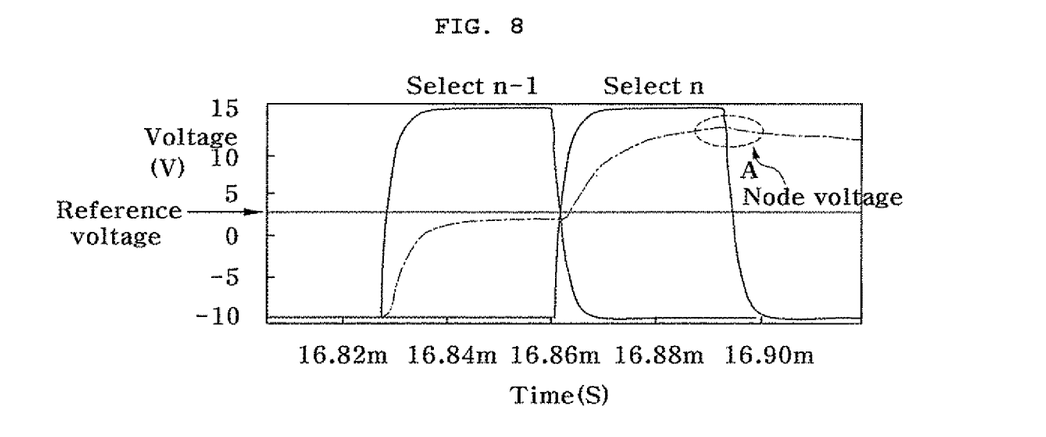
FIG. 8 is a graph illustrating operations of the circuits in the circuit diagrams shown in FIGS. 6A and 6B.

Next, operations of the circuits in the circuit diagrams shown in FIGS. 6A and 6B will be described with reference to FIG. 8.

First, when the $(n-1)^{th}$ scan line 309 of FIGS. 6A and 6B is selected, the switching element 301 is turned on and therefore the reference voltage of the readout system 305 connected to the source terminal of the switching element 301 is applied to node A. That is, the charge storage element 302 is charged to the reference voltage of the readout system 305. FIG. 8 shows an example in which the reference voltage of the readout system is 3 V and the select voltage of the scan line is about 15 V. At this time, it can be seen that the voltage of node A is lower than the reference voltage due to parasitic capacitance, etc.

Then, when the $n^{th}$ scan line is selected, the photosensitive element 303 is turned on and therefore the select voltage of the scan line 309 is applied to node A. Referring to FIG. 8, it can be seen that node A of the charge storage element 302 is charged to about 13 V, which is higher than the reference voltage of the readout system when the $n^{th}$ scan line is selected. That is, it can be seen that voltages conventionally applied to both terminals of the charge storage element are as low as the reference voltage, but voltages applied to both terminals of the charge storage element according to the exemplary embodiment of the present invention as shown in FIG. 8 are as high as a select voltage of the scan line.

When external light is incident on the photosensitive region in the LCD with the photosensitive region, a current flows through the photosensitive element 303. When the photosensitive element 303 is turned on according to external illuminance, charges stored in the charge storage element 302 are leaked as a leakage current to the scan line 309. That is, the charge storage element 302 is discharged by a leakage current amount according to external illuminance applied to the photosensitive element 303 before the next $(n-1)^{th}$ scan line is selected.

Then, when the $(n-1)^{th}$ scan line 309 is re-selected, the charge storage element 302 is re-charged to the reference voltage through the switching element 301. The readout system 305 detects a difference of external illuminance by measuring a charge amount. When a discharge amount is small and the voltage of node A of the charge storage element 302 is higher than the reference voltage, a difference of external illuminance can be detected by measuring a discharge amount from node A to the readout system 305. According to a difference of external illuminance, a portion touched by a finger can be distinguished from an untouched portion.

As described above, according to the present invention, a charge storage element is connected to a common line for a display operation in a photosensitive region, thereby it is possible to reduce the load of scan lines and reduce a line delay when a scan line is selected.

Conventionally, voltages applied to both terminals of the charge storage element are as low as a reference voltage. However, the present invention can increase a maximum readout voltage since voltages applied to both the terminals of the charge storage element of the photosensitive region are as high as a select voltage of the scan line.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An Liquid Crystal Display (LCD) with a touch screen function, comprising:
    an array substrate having a display region and a photosensitive region divided by data lines, scan lines, and common lines,
    wherein the photosensitive region comprises:
    a switching element having a first terminal connected to an $(n-1)^{th}$ scan line of the scan lines to receive a select signal and a second terminal connected to a readout system;
    a charge storage element having a first terminal connected to a third terminal of the switching element and a second terminal connected to the common lines; and
    a photosensitive element having a first terminal connected to an $n^{th}$ scan line of the scan lines and a second terminal connected to the first terminal of the charge storage element,
    wherein when the photosensitive element is turned on according to external illuminance, the charge storage element is discharged and the readout system detects a difference of external illuminance.

2. The LCD of claim 1, wherein the switching element is turned on and the charge storage element is charged to a reference voltage of the readout system when the $(n-1)^{th}$ scan line is selected, the photosensitive element is turned on and the charge storage element is charged to a select voltage of the $n^{th}$ scan line when the $n^{th}$ scan line is selected, and the readout system detects the difference of external illuminance by measuring a charge amount of the charge storage element when the $(n-1)^{th}$ scan line is re-selected.

3. The LCD of claim 1, wherein the switching element is turned on and the charge storage element is charged to a reference voltage of the readout system when the $(n-1)^{th}$ scan line is selected, the photosensitive element is turned on and the charge storage element is charged to a select voltage of the $n^{th}$ scan line when the $n^{th}$ scan line is selected, and the readout system detects the difference of external illuminance by measuring a discharge amount of the charge storage element when the $(n-1)^{th}$ scan line is re-selected.

4. The LCD of claim 1, wherein the switching element is turned on and the charge storage element is charged to a reference voltage of the readout system when the $(n-1)^{th}$ scan line is selected, and the photosensitive element is turned on and the charge storage element is charged to a select voltage of the $n^{th}$ scan line when the $n^{th}$ scan line is selected, and
    wherein when the $(n-1)^{th}$ scan line is re-selected, the readout system detects the difference of external illuminance by measuring a charge amount from the readout system to the charge storage element when a voltage stored in the charge storage element is lower than the reference voltage of the readout system and measuring a discharge amount from the charge storage element to the readout system when a voltage stored in the charge storage element is higher than the reference voltage of the readout system.

5. The LCD of claim 2, wherein the select voltage of the scan line is higher than the reference voltage of the readout system.

6. The LCD of claim 3, wherein the select voltage of the scan line is higher than the reference voltage of the readout system.

7. The LCD of claim 4, wherein the select voltage of the scan line is higher than the reference voltage of the readout system.

8. The LCD of claim 1, wherein the switching element is a transistor in which the first terminal is a gate, the second terminal is a source, and the third terminal is a drain.

9. The LCD of claim 1, wherein the photosensitive element is a photodiode in which the first terminal is an anode and the second terminal is a cathode.

10. The LCD of claim 1, wherein the photosensitive element further comprises a third terminal connected to a scan line and is a phototransistor in which the first terminal is a source, the second terminal is a drain, and the third terminal is a gate.

11. A method for detecting a difference of external illuminance in a readout system when a photosensitive element is turned on according to the external illuminance and a charge storage element is discharged in an LCD with a touch screen function
    comprising:
    an array substrate having a display region and a photosensitive region divided by data lines, scan lines, and common lines,
    in which a photosensitive region comprises a switching element having a first terminal connected to an (n−1)th scan line of the scan lines to receive a select signal and a second terminal connected to a readout system;
    a charge storage element having a first terminal connected to a third terminal of the switching element and a second terminal connected to the common lines; and
    a photosensitive element having a first terminal connected to an nth scan line of the scan lines and a second terminal connected to the first terminal of the charge storage element, wherein when the photosensitive element is turned on according to external illuminance, the charge storage element is discharged and the readout system detects a difference of external illuminance, the method comprising:
    turning on the switching element and charging the charge storage element to a reference voltage of the readout system when an (n−1)th scan line of scan lines is selected;
    turning on the photosensitive element and charging the charge storage element to a select voltage of an nth scan line of the scan lines when the nth scan line of the scan lines is selected; and
    detecting, when the (n−1)th scan line of the scan lines is re-selected in a next frame and the switching element is turned on, the difference of external illuminance by measuring a discharge amount from the charge storage element to the readout system if a voltage stored in the charge storage element is higher than the reference voltage of the readout system and measuring a charge amount from the readout system to the charge storage element when a voltage stored in the charge storage element is lower than the reference voltage of the readout system.

12. The method of claim 11, wherein the select voltage of the scan line is higher than the reference voltage of the readout system.

13. The method of claim 11, wherein the switching element is a transistor in which the first terminal is a gate, the second terminal is a source, and the third terminal is a drain.

14. The method of claim 11, wherein the photosensitive element is a photodiode in which the first terminal is an anode and the second terminal is a cathode.

15. The method of claim 11, wherein the photosensitive element further comprises a third terminal connected to the scan line and is a phototransistor in which the first terminal is a source, the second terminal is a drain, and the third terminal is a gate.

\* \* \* \* \*